(12) United States Patent
Nagasawa et al.

(10) Patent No.: US 8,910,974 B2
(45) Date of Patent: Dec. 16, 2014

(54) OCCUPANT PROTECTION DEVICE (75) Inventors: Isamu Nagasawa, Tokyo (JP); Noriyoshi Baba, Tokyo (JP); Tetsuya Nakase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/524,445

(22) Filed: Jun. 15, 2012

(65) Prior Publication Data

US 2013/0001935 A1 Jan. 3, 2013

(30) Foreign Application Priority Data

Jun. 30, 2011 (JP) ................. 2011-146838

(51) Int. Cl.
*B60R 21/203* (2006.01)
*B60R 21/015* (2006.01)
*B60R 21/231* (2011.01)
*B60R 21/01* (2006.01)

(52) U.S. Cl.
CPC ............ *B60R 21/203* (2013.01); *B60R 21/015* (2013.01); *B60R 21/231* (2013.01); *B60R 2021/23107* (2013.01); *B60R 21/01* (2013.01); *B60R 2021/01211* (2013.01)
USPC .................. 280/743.1; 280/729; 280/731

(58) Field of Classification Search
CPC .................. B60R 2021/23107; B60R 21/015; B60R 21/013
USPC ................ 280/728.1, 734, 731, 729
See application file for complete search history.

(56) References Cited

U.S. PATENT DOCUMENTS

| | | | |
|---|---|---|---|
| 5,240,283 A | 8/1993 | Kishi et al. | |
| 5,253,892 A | 10/1993 | Satoh | |
| 5,310,214 A * | 5/1994 | Cuevas | 280/729 |
| 5,358,273 A | 10/1994 | Onishi et al. | |
| 5,486,019 A * | 1/1996 | Chevroulet et al. | 280/730.1 |
| 5,529,337 A | 6/1996 | Takeda et al. | |
| 5,556,128 A * | 9/1996 | Sinnhuber et al. | 280/730.2 |
| 5,560,649 A | 10/1996 | Saderholm et al. | |
| 5,575,497 A * | 11/1996 | Suyama et al. | 280/730.1 |
| 5,626,359 A * | 5/1997 | Steffens et al. | 280/735 |
| 5,992,875 A * | 11/1999 | Cundill | 280/728.2 |
| 6,139,052 A * | 10/2000 | Preamprasitchai | 280/735 |
| 6,195,008 B1 * | 2/2001 | Bader | 340/573.1 |
| 6,290,257 B1 * | 9/2001 | Bunce et al. | 280/739 |
| 6,419,262 B1 * | 7/2002 | Fendt et al. | 280/729 |

(Continued)

FOREIGN PATENT DOCUMENTS

| | | |
|---|---|---|
| JP | 2006-69384 | 3/2006 |
| WO | 93/16902 | 9/1993 |

*Primary Examiner* — Nicole Verley
(74) *Attorney, Agent, or Firm* — Smith, Gambrell & Russell LLP (57) ABSTRACT

There is provided an occupant protection device. An air bag device according to the present invention protects an occupant against an impact caused by a collision of a vehicle by inflating and expanding a head protection air bag body and a chest protection air bag body upon the impact which are housed in a center pad of a steering wheel, the occupant protection device including an inflation and expansion mode control unit configured to inflate and expand the head protection air bag body and the chest protection air bag body mutually independently in accordance with a collision mode of the vehicle, and to control inflation and expansion modes of the head protection air bag body and the chest protection air bag body when inflated and expanded.

4 Claims, 5 Drawing Sheets

(56) References Cited

U.S. PATENT DOCUMENTS

| | | | |
|---|---|---|---|
| 6,550,804 B2 | 4/2003 | Burdock | |
| 6,581,961 B1* | 6/2003 | Bowers | 280/735 |
| 6,594,570 B2* | 7/2003 | Nagao et al. | 701/45 |
| 6,709,009 B1* | 3/2004 | Michael et al. | 280/729 |
| 6,893,044 B2 | 5/2005 | Holmes et al. | |
| 7,040,650 B2 | 5/2006 | Neupert et al. | |
| 7,070,201 B2* | 7/2006 | Song et al. | 280/730.1 |
| 7,401,807 B2* | 7/2008 | Breed et al. | 280/735 |
| 7,426,429 B2* | 9/2008 | Tabe | 701/45 |
| 7,663,502 B2* | 2/2010 | Breed | 340/12.25 |
| 7,793,973 B2* | 9/2010 | Sato et al. | 280/730.2 |
| 7,890,263 B2* | 2/2011 | Prakah-Asante et al. | 701/300 |
| 8,179,254 B2* | 5/2012 | Hyde et al. | 340/540 |
| 8,260,502 B2* | 9/2012 | Yonak et al. | 701/45 |
| 8,333,406 B2* | 12/2012 | Slaats | 280/736 |
| 2002/0043789 A1* | 4/2002 | Lichtinger et al. | 280/735 |
| 2004/0163871 A1* | 8/2004 | Nobusawa | 180/268 |
| 2004/0178612 A1* | 9/2004 | Tabe | 280/735 |
| 2005/0184489 A1* | 8/2005 | Kobayashi | 280/729 |
| 2005/0236817 A1* | 10/2005 | Sonoda et al. | 280/730.1 |
| 2005/0275201 A1 | 12/2005 | Schneider et al. | |
| 2006/0163848 A1 | 7/2006 | Abe | |
| 2006/0197324 A1 | 9/2006 | Klinkenberger | |
| 2006/0232050 A1 | 10/2006 | Kumagai et al. | |
| 2006/0244251 A1* | 11/2006 | Muller | 280/777 |
| 2006/0284400 A1* | 12/2006 | Sakakibara et al. | 280/728.2 |
| 2007/0267852 A1* | 11/2007 | Enders | 280/730.1 |
| 2008/0054602 A1* | 3/2008 | Yang | 280/729 |
| 2008/0179864 A1* | 7/2008 | Nishizawa | 280/729 |
| 2009/0039625 A1* | 2/2009 | Breed | 280/729 |
| 2009/0121462 A1* | 5/2009 | Rick | 280/729 |
| 2010/0100285 A1* | 4/2010 | Tobaru | 701/45 |
| 2010/0213692 A1* | 8/2010 | Nagai et al. | 280/729 |
| 2010/0324774 A1* | 12/2010 | Bouni et al. | 701/29 |
| 2012/0065843 A1* | 3/2012 | Thomas et al. | 701/45 |
| 2012/0296567 A1* | 11/2012 | Breed | 701/468 |
| 2013/0001934 A1* | 1/2013 | Nagasawa et al. | 280/731 |
| 2013/0001936 A1 | 1/2013 | Nagasawa et al. | |

* cited by examiner

OCCUPANT PROTECTION DEVICE

CROSS-REFERENCE TO RELATED APPLICATIONS

The present application claims priority from Japanese Patent Application No. 2011-146838 filed on Jun. 30, 2011, the entire contents of which are hereby incorporated by reference.

BACKGROUND OF THE INVENTION

1. Field of the Invention

The present invention relates to an occupant protection device, particularly to an occupant protection device in which air bag bodies are housed in the center pad of a steering wheel.

2. Description of the Related Art

Conventionally, there has been known an occupant protection device in which an air bag body is folded and housed in the center pad of a steering wheel and is expanded toward the driver upon the vehicle experiencing an impact so that the driver is protected against the impact.

Here, the center pad of the steering wheel normally rotates along with the steering wheel in accordance with a driving operation of the driver. For this reason, the air bag body housed in the center pad is formed so as to be circular so that the air bag body can be inflated and expanded with the same shape for any steering angle of the steering wheel. The air bag body formed in a circular shape mainly protects the head of the driver.

In recent years, there is an increasing need for an air bag body housed in a steering wheel, which is capable of protecting not only the head of the driver, but also other body parts of the driver sufficiently. In particular, because the chest of the driver is restrained by a seat belt, a strong pressure may be applied to the chest upon the vehicle experiencing an impact.

As a device capable of protecting not only the head of the driver, but also other body parts of the driver, for example, Japanese Unexamined Patent Application Publication (JP-A) No. 2006-069384 discloses an air bag device for an automobile, in which an air bag body is mounted on a center pad configured not to rotate, the air bag body being formed in such a manner as to include a head protection portion, a chest protection portion, and an abdomen protection portion.

JP-A No. 2006-069384 protects not only the head of the driver but also the chest and abdomen of the driver, however, the same inflation and expansion mode is applied to both the head and chest of the driver.

Normally, the distance between the chest of the driver and the steering wheel is shorter that the distance between the head of the driver and the steering wheel. Therefore, the driver can be more effectively protected against an impact to the vehicle by inflating and expanding the air bag body firstly toward the chest of the driver first which is closer to the steering wheel than the head.

The chest of the driver is restrained by a seat belt. Accordingly, a strong pressure may be applied to the chest of the driver because of an impact caused by a collision of the vehicle. Accordingly, the driver can be more effectively protected against the impact to the vehicle by inflating and expanding the air bag body toward the chest of the driver first.

In some countries where wearing a seat belt is not regulated, a priority is placed on protection of the head of the driver rather than reduction of the above-described pressure on the chest. In such a case, the driver can be more effectively protected against an impact to the vehicle by inflating and expanding the air bag body firstly toward the head of the driver first.

As can be appreciated, in the above-described JP-A No. 2006-069384, since the inflation and expansion mode of an air bag body is not differentiated in accordance with the driver's body part to be protected, there is room for an improvement with regard to effective protection of the driver against an impact to the vehicle.

SUMMARY OF THE INVENTION

In view of the above-described conventional situation, it is an object of the present invention to provide an occupant protection device that is capable of improving the safety of the driver upon an impact to the vehicle by effectively protecting the driver against the impact to the vehicle.

In order to solve such a problem, an aspect of the present invention provides an occupant protection device that protects an occupant against an impact caused by a collision of a vehicle by inflating and expanding a plurality of air bag bodies upon the impact which are housed in a center pad of a steering wheel, the occupant protection device including an inflation and expansion mode control unit that inflates and expands the air bag bodies mutually independently in accordance with a collision mode of the vehicle, and to control inflation and expansion modes of the air bag bodies when inflated and expanded. Thus the safety of the occupant upon an impact to the vehicle can be improved by effectively protecting the occupant against the impact to the vehicle.

The inflation and expansion mode control unit may control the inflation expansion modes of the first and second air bag bodies in accordance with whether or not a seat belt of the occupant is fastened.

The air bag bodies may include at least a first air bag body configured to protect the occupant's head, and a second air bag body configured to protect the occupant's chest, and in the case where the inflation and expansion mode control unit determines that the occupant is wearing the seat belt, the inflation and expansion mode control unit may control the second air bag body to be inflated and expanded before the first air bag body is inflated and expanded.

The air bag bodies may include at least a first air bag body configured to protect the occupant's head, and a second air bag body configured to protect the occupant's chest, and in the case where the inflation and expansion mode control unit determines that the vehicle rolls over, the inflation and expansion mode control unit is may control only the first air bag body so as to be inflated and expanded, and to control the second air bag body so as not to be expanded.

In the case where the inflation and expansion mode control unit determines that the occupant is not wearing the seat belt, the inflation and expansion mode control unit may control the first air bag body to be inflated and expanded before the second air bag body is inflated and expanded.

The inflation and expansion mode control unit may control either one of the first and second air bag bodies to be inflated and expanded in accordance with a collision mode of the vehicle.

In order to solve such a problem, another aspect of the present invention provides an occupant protection device that inflates and expands a plurality of air bag bodies mutually independently upon a collision of a vehicle so as to protect an occupant against an impact caused by the collision of the vehicle, the occupant protection device including an inflation and expansion mode control unit that controls inflation and expansion modes of the air bag bodies in accordance with collision modes of the vehicle.

DETAILED DESCRIPTION OF THE INVENTION

Hereinafter, an embodiment of the present invention will be described with reference to the drawings. An air bag device (occupant protection device) 10 which is an embodiment of the present invention is housed in a center pad 7 of a steering wheel 3. The air bag device 10 includes a head protection air bag body (a first air bag body) 11 and a chest protection air bag body (a second air bag body) 12 that are expandable toward an occupant upon a collision of the vehicle.

As described above, the air bag device 10 of the present embodiment includes the head protection air bag body 11 for head protection and the chest protection air bag body 12 for chest protection, however, without being limited to this, for example, a single air bag body may be formed into a plurality of chambers using pressure valves or the like.

Figure 1:
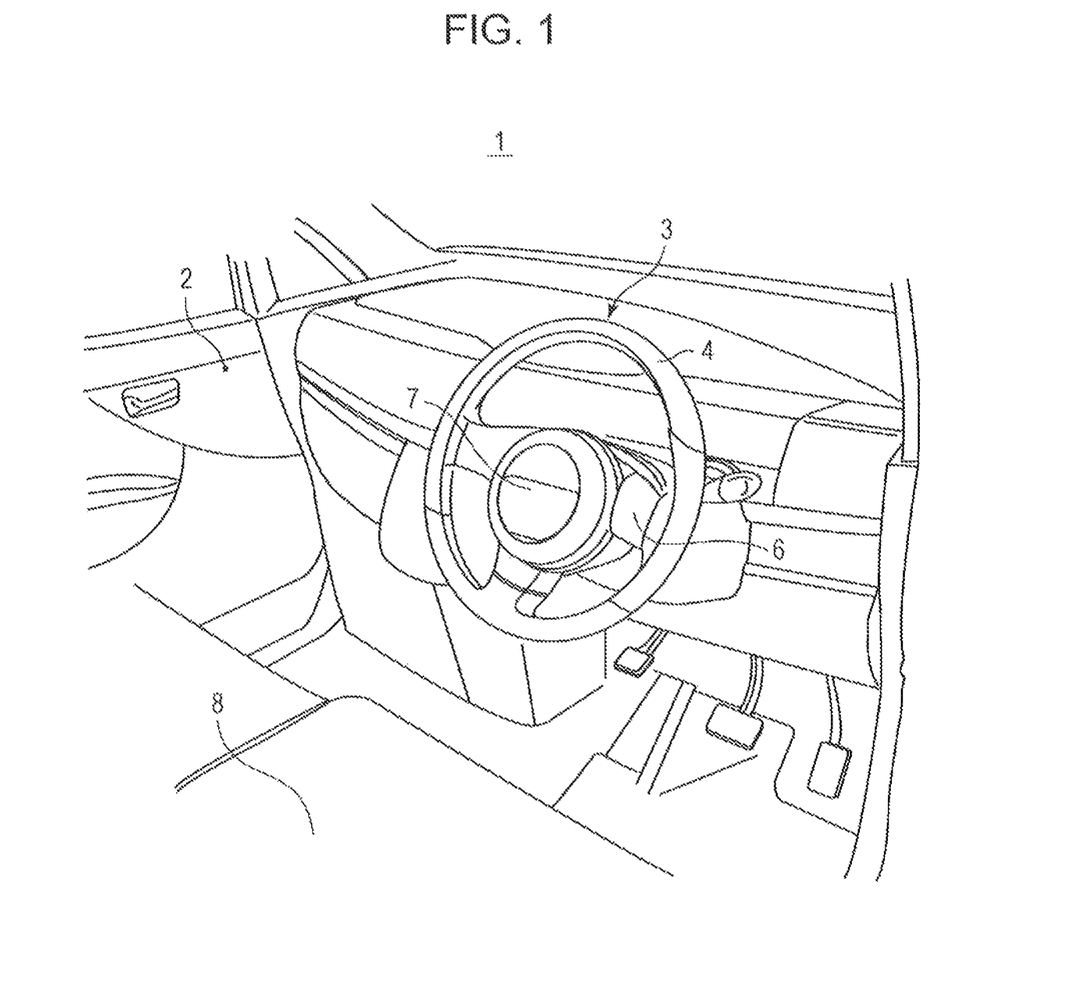
FIG. 1 is a perspective view schematically illustrating a cabin of a vehicle on which an occupant protection device as an embodiment of the present invention is mounted, the view being taken from the rear of the vehicle toward the front.

First, a steering wheel 3 of a vehicle 1, on which an air bag device 10 as an embodiment of the present invention is mounted is described with reference to FIG. 1. FIG. 1 is a perspective view schematically illustrating a cabin 2 of the vehicle 1 on which the air bag device 10 as an embodiment of the present invention is mounted, the view being taken from the rear of the vehicle 1 toward the front.

As illustrated in FIG. 1, the steering wheel 3 of the present embodiment includes a ring-shaped rim 4 which forms the outer circumference of the steering wheel 3, a spoke 6 which connects between the rim 4 and a steering shaft 5, and a center pad 7 which is supported independently and separately from the steering shaft 5 so as to be non-rotatable.

That is to say, the center pad 7 of the present embodiment is designed not to rotate without being interconnected to a steering angle operation of the rim 4 by an occupant M. The air bag device 10 is housed inside the center pad 7.

Here, in the case where the center pad 7 of the steering wheel 3 is configured to be rotatable, each air bag body housed in the center pad 7 is formed to be circular so as to be able to cope with any steering angle of the steering wheel 3.

On the other hand, as described above, in the steering wheel 3 of the present embodiment, the center pad 7 is configured to be non-rotatable, thus the shapes of the head protection air bag body 11 and the chest protection air bag body 12 that are housed in the center pad 7 can be predetermined.

As described above, the center pad 7 of the steering wheel 3 of the present embodiment is disposed so as to be non-rotatable with respect to the steering wheel 3, however, the center pad 7 is not limited to be non-rotatable as long as the center pad 7 is disposed in a configuration which allows the center pad 7 to return to a neutral position when the head protection air bag body 11 and the chest protection air bag body 12 are expanded.

Figure 2:
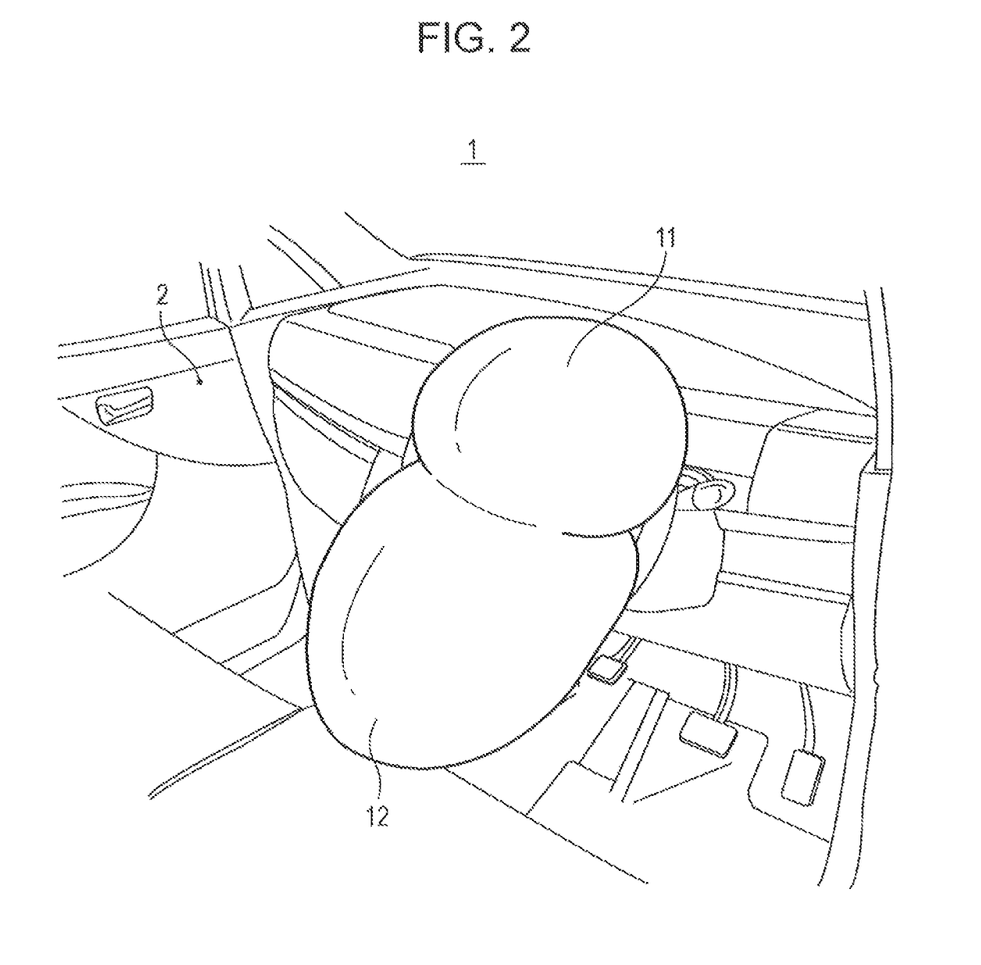
FIG. 2 is a perspective view illustrating air bag bodies of the occupant protection device in FIG. 1 when inflated and expanded.

Next, the head protection air bag body 11 and the chest protection air bag body 12 of the air bag device 10 of the present embodiment are described with reference to FIGS. 2 and 3. FIG. 2 is a perspective view illustrating the head protection air bag body 11 and the chest protection air bag body 12 of the air bag device 10 in FIG. 1 when inflated and expanded.

Figure 3:
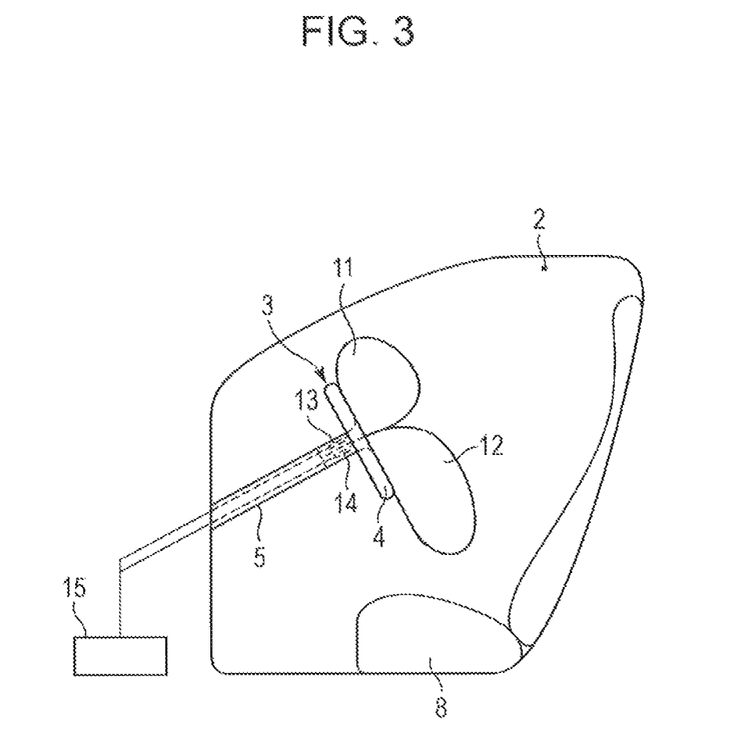
FIG. 3 is a side view schematically illustrating the cabin of the vehicle on which the occupant protection device as the embodiment of the present invention is mounted, the view being taken from one side of the vehicle in a vehicle width direction, and illustrating the air bag bodies of the occupant protection device when inflated and expanded.

FIG. 3 is a side view schematically illustrating the cabin 2 of the vehicle 1 in which the air bag device 10 as the embodiment of the present invention is mounted, the view being taken from one side of the vehicle in the vehicle width direction, and illustrating the head protection air bag body 11 and the chest protection air bag body 12 of the air bag device 10 when inflated and expanded.

As illustrated in FIGS. 2 and 3, the air bag device 10 includes the head protection air bag body 11 for protecting the head and the chest protection air bag body 12 for protecting the chest as described above.

The head protection air bag body 11 and the chest protection air bag body 12 are formed to be elliptical when viewed from the rear toward the front in the vehicle front-rear direction and can be inflated and expanded. The head protection air bag body 11 is formed to be elliptical when viewed from the vehicle width direction and can be inflated and expanded.

Then in the air bag device 10, the head protection air bag body 11 and the chest protection air bag body 12 includes, as gas blowing unit, an inflator 13 for the head protection air bag body 11 and an inflator 14 for the chest protection air bag body 12, respectively.

That is to say, the air bag device 10 of the present embodiment has a configuration such that the head protection air bag body 11 and the chest protection air bag body 12 can be inflated and expanded mutually independently.

The inflator 13 for the head protection air bag body 11 and the inflator 14 for the chest protection air bag body 12 have an inflation and expansion mode control unit 15 connected thereto for performing output control of the inflator 13 for the head protection air bag body 11 and the inflator 14 for the chest protection air bag body 12.

That is to say, the output of the inflator 13 for the head protection air bag body and the inflator 14 for the chest protection air bag body is controlled by the inflation and expansion mode control unit 15, and gas is outputted in accordance with the setting of the inflation and expansion mode control unit 15. The inflation and expansion mode control unit 15 is specifically described with reference to FIG. 4.

Figure 4:
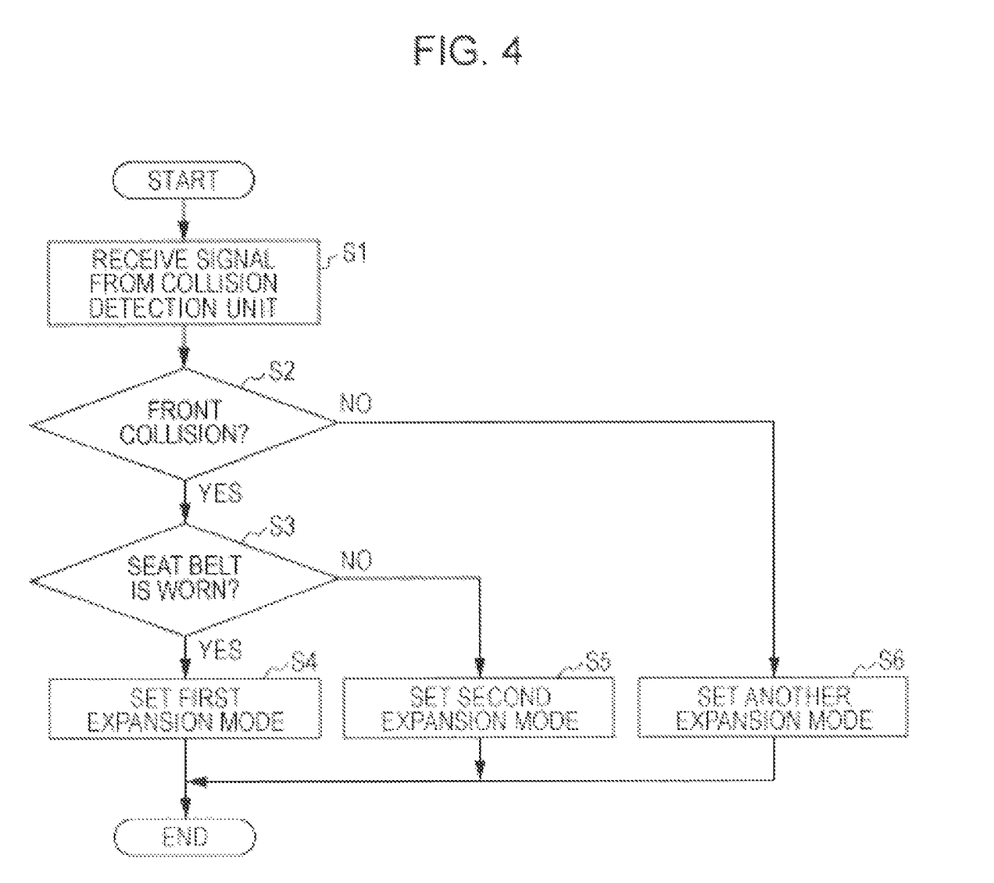
FIG. 4 is a flowchart showing the control flow of an output control unit of the occupant protection device as the embodiment of the present invention.

FIG. 4 is a flowchart showing the control flow of the inflation and expansion mode control unit 15 of the air bag device 10 as the embodiment of the present invention.

First, in step S1, a CPU of the inflation and expansion mode control unit 15 receives a signal from a detection unit (not shown) which detects an impact upon the vehicle 1 experiencing the impact. When detecting the impact experienced by the vehicle 1 in this process, if the impact is caused by a front collision, the CPU receives a signal from a front collision detection unit (not shown) which detects a front collision; if the impact is caused by a rear collision, the CPU receives a signal from a rear collision detection unit (not shown) which detects a rear collision; and if the impact is caused by a side collision, the CPU receives a signal from a side collision detection unit (not shown) which detects a side collision.

A described above, the detection unit of the present embodiment includes the front collision detection unit, the rear collision detection unit, and the side collision detection unit, however, without being limited to this, in the case where the detection unit of the present embodiment includes a detection unit other than the front collision detection unit, the rear collision detection unit, and the side collision, detection unit, a similar processing is performed.

In step S2, the CPU determines whether or not the signal received in the above-described step S1 is a signal from the front collision detection unit. That is to say, the CPU determines whether or not the impact experienced by the vehicle 1 detected in the above-described step S1 is caused by a front collision.

In this process, in the case where the CPU determines that the signal is from the front collision detection unit, the process flow proceeds to step S3. On the other hand, in the case where the CPU determines that the signal is not from the front collision detection unit, the process flow proceeds to step S6.

In step S3, in the case where the CPU has determined that the signal is from the front collision detection unit in the above-described step S2, whether or not an occupant is wearing a seat belt 9 is determined. In the case where the CPU determines in this process that the occupant is wearing the seat belt 9, the process flow proceeds to step S4.

On the other hand, in the case where the CPU determines in this process that the occupant is not wearing the seat belt 9, the process flow proceeds to step S5. In this process flow, there is a method of utilizing some information used for displaying on a display screen, as a type of method for determining whether or not the occupant is wearing the seat belt 9. As another type of method for determining whether or not the occupant is wearing the seat belt 9, there is also a method in which a pretensional tensile strength is used.

In step S4, in the case where the CPU has determined in step S3 that the occupant is wearing the seat belt 9, the inflation and expansion mode of the head protection air bag body 11 and the chest protection air bag body 12 is set to a first expansion mode.

In this process, the chest protection air bag body 12 is first expanded as the first expansion mode, and subsequently, the head protection air bag body 11 is inflated and expanded. The first expansion mode is not specifically limited to the above as long as the degree of injury to the chest of an occupant can be reduced.

That is to say, in the case where it is determined that the received impact mode corresponds to a front collision detected by the front collision detection unit in the above-described step S2, and the occupant is wearing the seat belt 9 in the above-described step S3, the chest protection air bag body 12 is first inflated and expanded, and subsequently, the head protection air bag body 11 is inflated and expanded.

In this manner, in the case where it is determined that the occupant is wearing the seat belt 9, a pressure acting on the chest of the occupant can be reduced by inflating and expanding the chest protection air bag body 12 with a short stroke.

Thus, according to the air bag device 10 of the present embodiment, a pressure acting on the chest of the occupant can be reduced as described above, and therefore, the safety of the occupant experiencing an impact caused by a collision of the vehicle 1 can be improved.

In step S5, in the case where the CPU has determined in step S3 that the occupant is not wearing the seat belt 9, a second expansion mode is set. In this process, the head protection air bag body 11 is first expanded as the second expansion mode, and subsequently, the chest protection air bag body 12 is inflated and expanded.

That is to say, in this process, in the case where it is determined that the received impact mode corresponds to a front collision detected by the front collision detection unit in the above-described step S2, and the occupant is not wearing the seat belt 9 in the above-described step S3, the head protection air bag body 11 is first inflated and expanded, and subsequently, the chest protection air bag body 12 is inflated and expanded. The second expansion mode is not specifically limited to the above as long as the degree of injury to the head of an occupant can be reduced.

In this manner, in the case where it is determined that the occupant is not wearing the seat belt 9, the air bag device 10 of the present embodiment allows a priority to be placed on protecting the head rather than reducing a pressure acting on the chest of the occupant because of the seat belt 9.

In step S6, in the case where the CPU determines that the signal is not from the front collision detection unit in the above-described step S2, another expansion mode of the first air bag body and the second air bag body is set.

In this process, in the case where the CPU determines that the signal is not from the front collision detection unit in the above-described step S2, an expansion mode according to a signal from the rear collision detection unit or the side collision detection unit is set as another expansion mode.

In this process, the CPU inflates and expands only the head protection air bag body 11 as in an expansion mode according to a signal from the rear collision detection unit. Accordingly, in the case where a signal is received from the rear collision detection unit, the degree of impact on the head or jaw of an occupant at the time of rebound can be reduced by inflating and expanding only the head protection air bag body 11.

In this manner, the air bag device 10 of the present embodiment can set an inflation and expansion mode of the head protection air bag body 11 and the chest protection air bag body 12 in accordance with a collision state.

Accordingly, the air bag device 10 of the present embodiment can achieve inflation and expansion of the head protection air bag body 11 and the chest protection air bag body 12, which is suitable for body parts of an occupant to be protected, in accordance with a collision state. Thus, safety can be improved for each collision state.

In addition, the air bag device 10 of the present embodiment can set an inflation and expansion mode of the head protection air bag body 11 and the chest protection air bag body 12 in accordance with whether or not the seat belt 9 is fastened.

In this manner, the air bag device 10 of the present embodiment can improve safety in line with driving regulations by setting an inflation and expansion mode of the head protection air bag body 11 and the chest protection air bag body 12 in accordance with whether or not the seat belt 9 is fastened.

Figure 5:
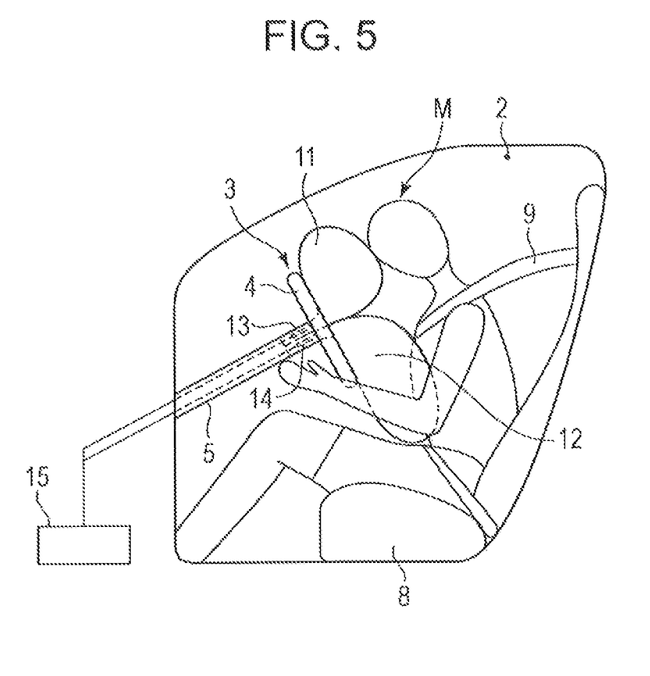
FIG. 5 is a side view, based on FIG. 3, illustrating an effect of the air bag bodies to a driver upon an impact to the vehicle.

Next, the effect of the head protection air bag body 11 and the chest protection air bag body 12 on an occupant upon the vehicle 1 experiencing an impact in which the air bag device 10 of the present embodiment is mounted will be described with reference to FIGS. 5 and 6. FIG. 5 is a side view, based on FIG. 3, illustrating the effect of the head protection air bag body 11 and the chest protection air bag body 12 on an occupant upon the vehicle 1 experiencing an impact.

Figure 6:
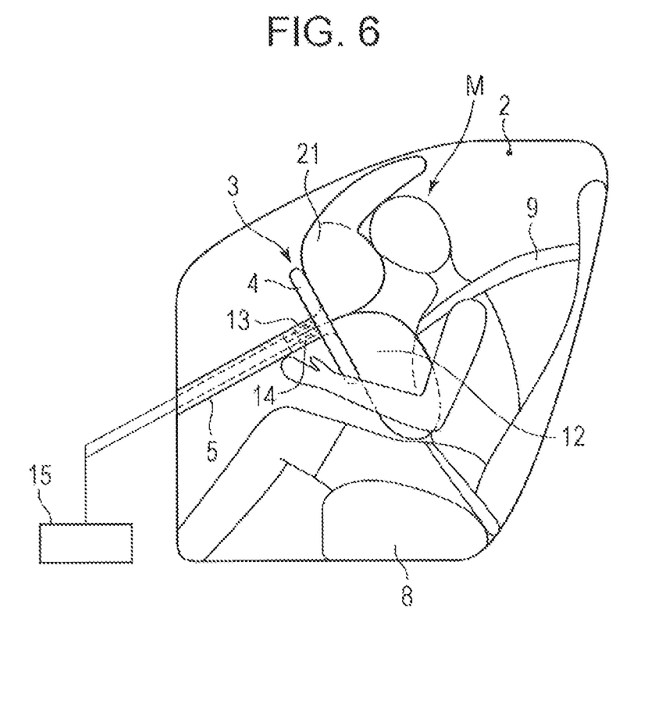
FIG. 6 is a side view schematically illustrating the cabin of the vehicle on which the occupant protection device as Modification 1 of the embodiment of the present invention is mounted, the view being taken from one side of the vehicle in the vehicle width direction, and illustrating the air bag bodies of the occupant protection device when inflated and expanded.

FIG. 6 is a side view schematically illustrating the cabin 2 of the vehicle 1 in which the occupant protection device 10 as Modification 1 of the embodiment of the present invention is mounted, the view being taken from one side of the vehicle in the vehicle width direction, and illustrating a head protection air bag body 21 and the chest protection air bag body 12 of the occupant protection device 10 when inflated and expanded.

As illustrated in FIG. 5, the head protection air bag body 11 of the present embodiment is inflated and expanded toward the head of an occupant upon the vehicle 1 experiencing an impact. On the other hand, the chest protection air bag body 12 is inflated and expanded toward the chest of an occupant upon the vehicle 1 experiencing an impact.

As illustrated in FIG. 6, the head protection air bag body 21 may be inflated and expanded in a form to protect the head of the occupant M. Accordingly, in the case where the vehicle 1 rolls over because of a collision with another vehicle, the head of the occupant M can be more reliably protected.

In this case, the head protection air bag body 11 and the chest protection air bag body 12 are inflated and expanded in a specific inflation and expansion mode in accordance with the state of the collision of the vehicle 1. Specifically, in the case where the occupant is wearing the seat belt 9 when an impact occurs because of the front collision of the vehicle 1, the chest protection air bag body 12 is inflated and expanded with a stroke shorter than that of the head protection air bag body 11.

The chest protection air bag body 12 is then inflated and expanded to form an area larger than that of the head protection air bag body 11. In this manner, in the case where the occupant is wearing the seat belt 9 when a front collision of the vehicle 1 occurs, the chest protection air bag body 12 is inflated and expanded with a stroke shorter than that of the head protection air bag body 11 and expands to form an area larger than that of the head protection air bag body 11. Therefore, a pressure acting on the chest of the occupant because of the seat belt 9 can be reduced.

On the other hand, the head protection air bag body 11 is inflated and expanded with a stroke longer than that of the chest protection air bag body 12. The head protection air bag body 11 is then inflated and expanded to form an area smaller than that of the chest protection air bag body 12.

In this manner, in the case where the occupant is wearing the seat belt 9 when a front collision of the vehicle 1 occurs, the head protection air bag body 11 is inflated and expanded with a stroke longer than that of the chest protection air bag body 12 and expands to form an area smaller than that of the chest protection air bag body 12. Therefore, the degree of impact to the head of the occupant can be reduced.

Accordingly, the air bag device 10 of the present embodiment protects the head and chest of the occupant with the head protection air bag body 11 and the chest protection air bag body 12, and thus, impact safety of the vehicle 1 can be improved.

In the case where the occupant is not wearing the seat belt 9 when the vehicle 1 experiences an impact caused by a front collision, the head protection air bag body 11 is inflated and expanded with a stroke shorter than that of the chest protection air bag body 12.

On the other hand, the chest protection air bag body 12 is inflated and expanded with a stroke longer than that of the head protection air bag body 11. In this manner, in the case where the occupant is not wearing the seat belt 9 when a front collision of the vehicle 1 occurs, the head protection air bag body 11 is inflated and expanded with a stroke shorter than that of the chest protection air bag body 12. Therefore, the degree of impact on the head of the occupant can be reduced.

In the case where the seat belt 9 is not being worn, the chest protection air bag body 12 is inflated and expanded with a longer stroke because there is no pressure acting on the chest due to the seat belt 9.

Accordingly, the air bag device 10 of the present embodiment protects the head and chest of the occupant with each inflation and expansion mode of the head protection air bag body 11 and the chest protection air bag body 12, in accordance with whether or not the seat belt 9 is fastened, and thus, impact safety of the vehicle 1 can be improved.

Upon an impact caused by a rear collision of the vehicle 1 as a mode of a collision other than a front collision of the vehicle 1, only the head protection air bag body 11 is inflated and expanded. In this manner, by inflating and expanding only the head protection air bag body 11 upon an impact caused by a rear collision of the vehicle 1, the safety of the occupant upon the impact caused by a rear collision of the vehicle 1 can be improved with a minimum required inflation and expansion.

As described above, the air bag device 10 of the present embodiment can set different inflation and expansion modes of the head protection air bag body 11 and the chest protection air bag body 12 in accordance with the type of impact experienced by the vehicle 1.

Consequently, according to the air bag device 10 of the present embodiment, the occupant can be effectively protected against an impact caused by a collision of the vehicle 1, and thus the safety of the occupant upon the vehicle experiencing an impact can be improved.

What is claimed is:

1. An occupant protection device for protecting an occupant against an impact caused by a collision of a vehicle comprising:

a plurality of air bag bodies housed in a center pad of a steering wheel, the air bag bodies including at least a first air bag body configured to protect the occupant's head and a second air bag body configured to protect the occupant's chest; and an expansion mode control unit configured to expand the air bag bodies mutually independently in accordance with a collision mode of the vehicle, and to control expansion modes of the air bag bodies when being expanded, wherein the expansion mode control unit is configured to determine the collision mode of the vehicle based on a collision detection unit that detects an impact upon the vehicle experiencing the impact, the expansion mode control unit is configured to control the expansion modes of the first and second air bag bodies in accordance with whether or not a seat belt of the occupant is fastened, the expansion mode control unit is configured to, in a scenario where the expansion mode control unit determines that the vehicle is experiencing a front collision and the occupant is wearing the seat belt, control the second air bag body to be expanded before the first air bag body is expanded, the expansion mode control unit is configured to, in a scenario where the expansion mode control unit determines that the vehicle is experiencing a front collision and the occupant is not wearing the seat belt, control the first air bag body to be expanded before the second air bag body is expanded, and the expansion mode control unit is configured to, in a scenario where the expansion mode control unit determines that the vehicle is experiencing a rear collision or a side collision, control the first air bay body to be expanded and control the second air bag body to not be expanded.

2. The occupant protection device according to claim 1, wherein the expansion mode control unit is configured to, in a scenario where the expansion mode control unit determines that the vehicle rolls over, control the first air bag body to be expanded and control the second air bag body to not be expanded.

3. The occupant protection device according to claim 1, wherein the expansion mode control unit is configured to, in a scenario where the expansion mode control unit determines that the occupant is not wearing the seat belt, control the first air bag body to be expanded before the second air bag body is expanded with the first air bag body being expanded with a stroke shorter than that of the second air bag body.

4. An occupant protection device for protecting an occupant against an impact caused by a collision of a vehicle comprising a plurality of air bag bodies that includes at least a first air bag body configured to protect the occupant's head and a second air bag body configured to protect the occupant's chest; and an expansion mode control unit configured to control expansion modes of the air bag bodies in accordance with modes of collision experienced by the vehicle, the expansion mode control unit being configured to receive data indicative as to whether or not a collision experienced by the vehicle has a front collision component and whether or not the occupant is wearing a seat belt, wherein the expansion mode control unit is configured to:
  if a front collision component is sensed and a seat belt worn status is determined by the expansion mode control unit, set the first and second air bag bodies under a first expansion mode,
  if a front collision component is sensed and a seat belt not worn status is determined by the expansion mode control unit, set the first and second air bag bodies in a second expansion mode different than the first expansion mode, and
  if the expansion mode control unit receives data that a front collision component is not involved, set the first and second air bag bodies in a third expansion mode that is different than the first and second expansion modes, in the first expansion mode, the first air bag body is expanded with a stroke longer than that of the second air bag body, and to form an area smaller than that of the second air bag body, in the second expansion mode, the second air bag body is expanded with a stroke shorter than that of the first air bag body, and to form an area larger than that of the first air bag body, and in the third expansion mode, the first air bag body is expanded and the second air bag body is not expanded.

* * * * *